No. 635,173. Patented Oct. 17, 1899.
F. MENZER.
VEHICLE BODY.
(Application filed Aug. 22, 1899.)
(No Model.) 2 Sheets—Sheet 1.
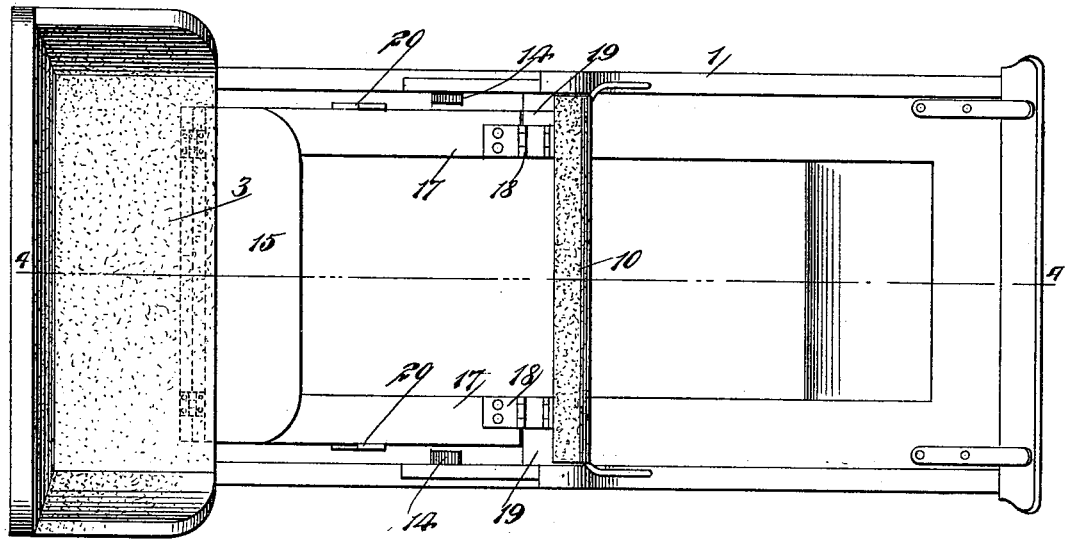
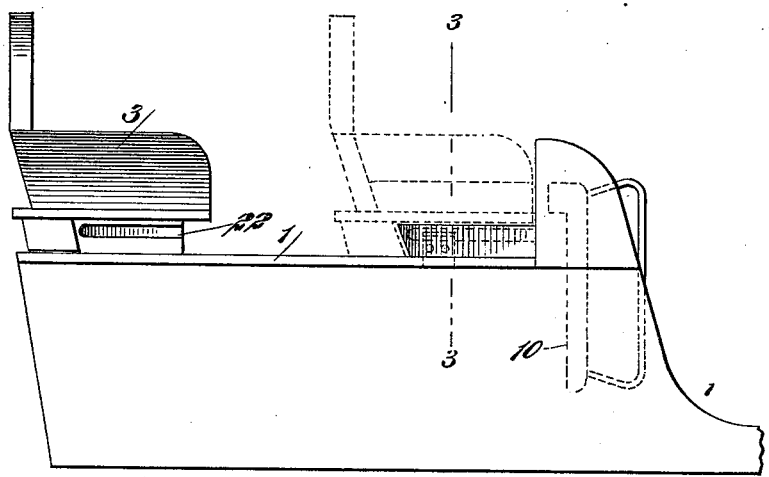
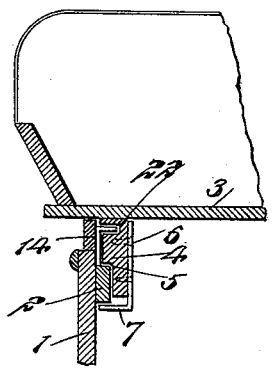
WITNESSES:
INVENTOR
BY
ATTORNEYS No. 635,173. Patented Oct. 17, 1899.
F. MENZER.
VEHICLE BODY.
(Application filed Aug. 22, 1899.)
(No Model.) 2 Sheets—Sheet 2.
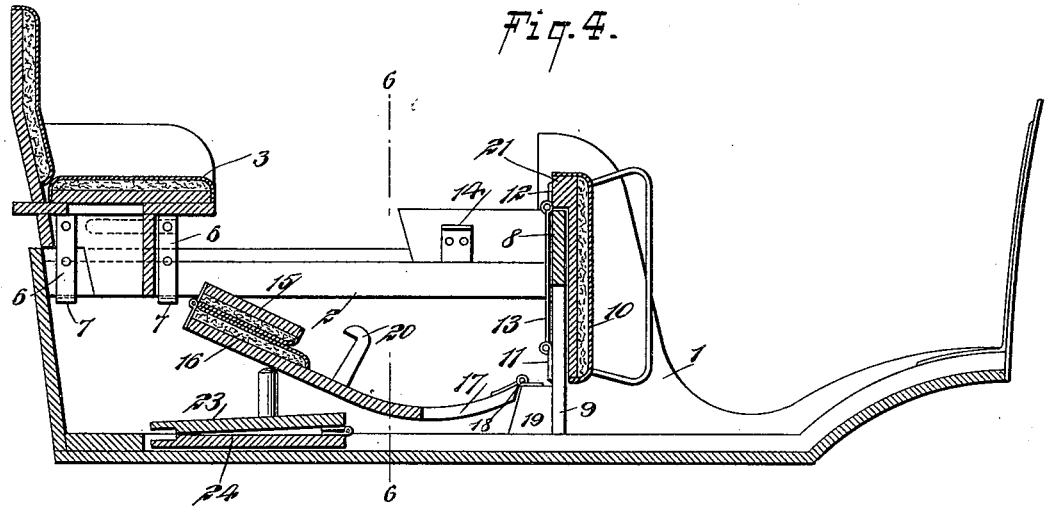
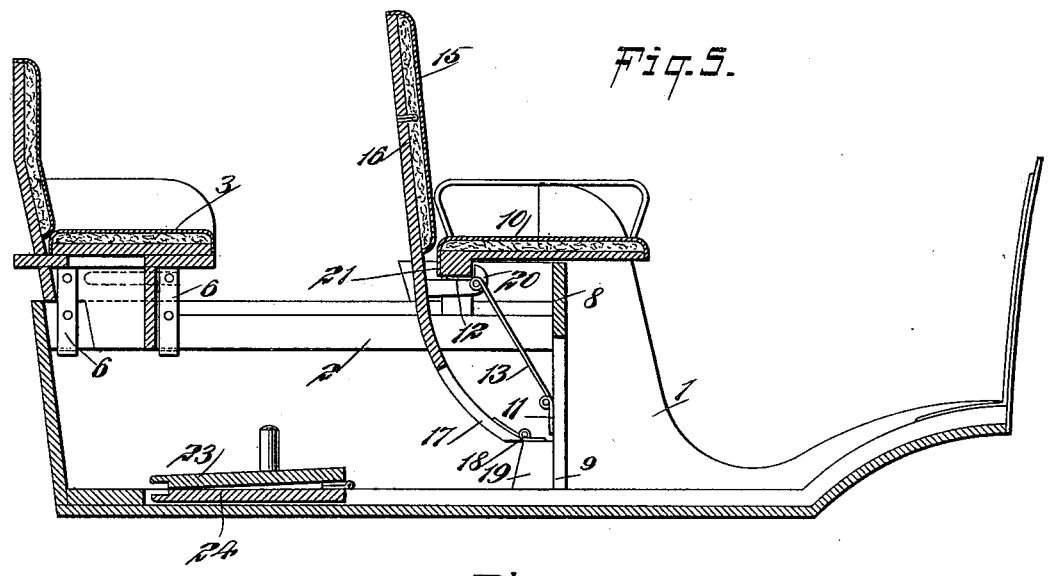
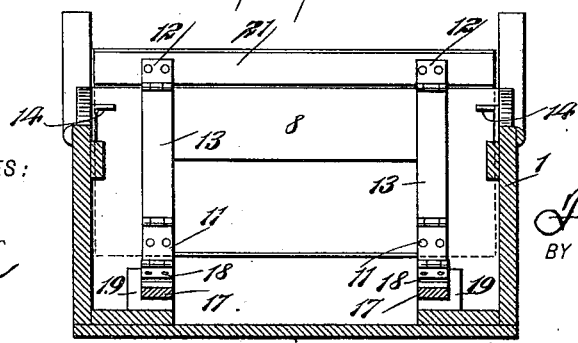

UNITED STATES PATENT OFFICE.

FREDERICK MENZER, OF FLINT, MICHIGAN.

VEHICLE-BODY.

SPECIFICATION forming part of Letters Patent No. 635,173, dated October 17, 1899.

Application filed August 22, 1899. Serial No. 728,111. (No model.)

*To all whom it may concern:*

Be it known that I, FREDERICK MENZER, of Flint, in the county of Genesee and State of Michigan, have invented a new and Improved Vehicle-Body, of which the following is a full, clear, and exact description.

This invention relates to improvements in vehicle-bodies, such as buggies, sleighs, and cutters; and the object is to provide a body of simple construction so arranged that it may be easily changed from a single to a double seated vehicle or from a double to a single seated vehicle.

I will describe a vehicle-body embodying my invention and then point out the novel features in the appended claims.

Reference is to be had to the accompanying drawings, forming a part of this specification, in which similar characters of reference indicate corresponding parts in all the figures.

Figure 1 is a plan view of a vehicle-body embodying my invention. Fig. 2 is a side view indicating in dotted lines a sliding seat in its forward position. Fig. 3 is a section on the line 3 3 of Fig. 2. Fig. 4 is a vertical section showing the front or auxiliary seat and its back as folded down. Fig. 5 is a similar section, but showing the front seat in its seating position; and Fig. 6 is a section on the line 6 6 of Fig. 4.

Referring to the drawings, 1 designates a box-like body of a vehicle having rails 2 on its opposite side pieces, upon which the rear seat 3 is designed to slide. The rear seat has side rails 4, provided with shoulders 5 for engaging upon the upper side of the rails 2, and attached by means of screws to the side rails 4 are metal straps 6, having outwardly-turned lower ends 7 for engaging against the under side of the rails 2. By means of these straps the seat is held from tilting relatively to the rails, and it is obvious that by removing the screws securing the straps to the seat the seat may be removed for repairs when necessary. Arranged near the front of the body portion and near the top thereof is a cross-bar 8, at the ends of which are standards 9.

The front or auxiliary seat 10 is mounted to swing relatively to the cross-bar 8, so as to rest upon the upper edge of the same when in seating position and to fold down in front of said cross-bar when the rear seat is to be moved forward to form a single-seat vehicle. As here shown, the seat 10 has double-hinge connection with the standards 9—that is, the lower leaf portions 11 are secured to the standards, while the upper leaf portions 12 are secured to the under side of the seat near its rear edge, and the two end leaf portions are connected by the central leaf 13. When the seat 10 is in its seating position, its rear portion rests upon brackets 14, secured to the inner side of the body portion, and the front portion of the seat rests upon the cross-bar 8, as clearly indicated in Fig. 5. When the seat is in its folded position, it extends down in front of the cross-bar, as indicated in Fig. 4, and when in this position it may serve as a curtain for the back seat when said back seat is in its forward position.

I provide a back for the seat 10, here shown as made in two sections 15 and 16, hinged together. The lower section 16 is attached to side bars 17, which are curved downward and forward and have their lower ends connected by hinges 18 to blocks 19, secured in the bottom of the vehicle-body.

When the back is in its raised position, as indicated in Fig. 5, metal hooks 20 are made to engage with the front edge of a cross-piece 21 on the bottom of the seat 10. When swinging the seat 10 forward, the hooks will be released, so that the back may be moved down into the body of the vehicle and the upper section 15 of the back folded down upon the section 16. The seat 3 may then be moved forward to serve as a single or front seat, the side pieces 4 of said seat being provided with channels 22 to receive the inwardly-turned ends of the brackets 14. By curving the side rails 17 downward and forward they will be out of the way of the feet of a person occupying the rear seat. When the rear seat is in its forward position, the top of the body may be inclosed by a cover consisting of two sections 23 24, which cover when not in use may be folded and placed in the bottom of the vehicle, as shown in Figs. 4 and 5.

Having thus fully described my invention, I claim as new and desire to secure by Letters Patent—

1. In a vehicle, a box-like body portion, a sliding seat arranged in the body portion, a front or auxiliary seat having double-hinged connection with the body and projections on the sides of the body on which the auxiliary seat may rest, substantially as specified.

2. In a vehicle, a box-like body, a cross-bar at the forward portion thereof, standards extended downward from the cross-bar, a seat, double-hinge connections between said seat and the standards, and brackets on the sides of the body upon which the seat may rest while also resting on the cross-bar, substantially as specified.

3. In a vehicle, a box-like body, a seat having a double-hinge connection with the body, a back for the seat, side rails for the back curved downward and forward and hinged to the body, and a hook carried by said back for engaging with the seat, substantially as specified.

4. In a vehicle, a body, a seat having double-hinge swinging connection with the body, a back comprising two sections hinged together, a hook carried by the back and adapted to engage with the seat, side rails for the back curved downward and forward, and hinge connections between the lower ends of said side rails and the vehicle-body, substantially as specified.

FREDERICK MENZER.

Witnesses:
  DAVID HEIMS,
  COLONEL O. SWAYZE.